Aug. 11, 1970  R. H. GRAF  3,523,356

METHOD FOR INSTALLING THERMOPLASTIC MATERIAL

Filed July 22, 1968  4 Sheets-Sheet 1

Aug. 11, 1970     R. H. GRAF     3,523,356

METHOD FOR INSTALLING THERMOPLASTIC MATERIAL

Filed July 22, 1968     4 Sheets-Sheet 3

United States Patent Office 3,523,356
Patented Aug. 11, 1970

3,523,356
METHOD FOR INSTALLING THERMOPLASTIC MATERIAL
Richard H. Graf, Hauppauge, N.Y., assignor to Hooker Chemical Corporation, Niagara Falls, N.Y., a corporation of New York
Continuation-in-part of application Ser. No. 504,337, Oct. 24, 1965. This application July 22, 1968, Ser. No. 748,116
Int. Cl. B29c 27/12
U.S. Cl. 29—453                               5 Claims

ABSTRACT OF THE DISCLOSURE

There is provided a method for dispensing coiled thermoplastic material in a condition suitable for installation on a support. The method comprises heating the coiled thermoplastic material in an enclosed storage zone having an aperture until the material is flexible, withdrawing the flexible material through the aperture in substantially rolling contact with the edges of the aperture and at a rate such that it remains flexible until it is applied to a workpiece, and mounting the material on a workpiece.

REFERENCE TO PRIOR APPLICATION

This is a continuation-in-part of Ser. No. 504,337, filed Oct. 24, 1965, now Pat. No. 3,439,379, issued Apr. 22, 1969.

This invention relates to a thermoplastic installation apparatus. In another aspect, the invention relates to an improved method for dispensing coiled thermoplastic material in a condition suitable for installation on a support. In another aspect, the invention relates to a method for installing a thermoplastic material on a support.

This invention is useful in any application in which thermoplastic material stock is stored in a coiled condition, but in which it is desired to apply the thermoplastic material in a straightened or flat condition. Thus, the invention is useful in the application of thermoplastic handrail covering material to a support, to the application of plastic decorative moldings to a workpiece, to the application of plastic tubing in various installations, and the like. In such applications, the thermoplastic material is generally in a rigid state in its coiled condition at atmospheric temperature, and is thereby difficult to manipulate. Therefore, it is desirable to provide a method for heating the thermoplastic material to facilitate the handling thereof. For this invention to be more readily understood, it will be described with particular reference to applying thermoplastic handrail material onto a support. However, it is to be understood that this is a specific embodiment of the invention, and is not intended to limit the invention.

Present handrail installation methods are costly, time-consuming and inefficient. One of the factors contributing to installation difficulties is the lack of suitable storage facilities that permit efficient dispensing of a heated handrail material onto the workpiece. Prior art methods have involved the unwinding of the coiled thermoplastic material, heating the thermoplastic material in a cumbersome blower and sleeve device, and then placing it on the railing support. The prior art methods often result in the handrail material becoming scratched or soiled in the installation process. These disadvantages are eliminated by the apparatus and method of the invention. Moreover, the prior art methods are accompanied by high labor costs compared to the costs involved in installing handrail material in accordance with the invention.

An object of the invention is to provide an improved installation apparatus which provides for the ready heating, storage and dispensing of large quantities of coiled thermoplastic material. The heating of the plastic material makes it flexible so that it is easily shaped and formed on the workpiece. The storage capacity of the apparatus can be varied by design to accommodate hundreds of feet of handrail material, which can be heated at one time, dispensed from the machine, and installed directly onto a support. The apparatus is preferably provided with an insulated jacket, so that the plastic material can be heated to the desired degree of flexibility, the heaters can be turned off and the insulated jacket maintains the temperature of the plastic material at a level sufficient to keep it in the flexible condition. The plastic material can be maintained in a flexible condition for long periods of time, thereby allowing the fast application of the material to the workpiece.

Further advantages of the invention will become apparent from the following description, wherein the invention is further described by reference to the accompanying drawings.

Figure 1:
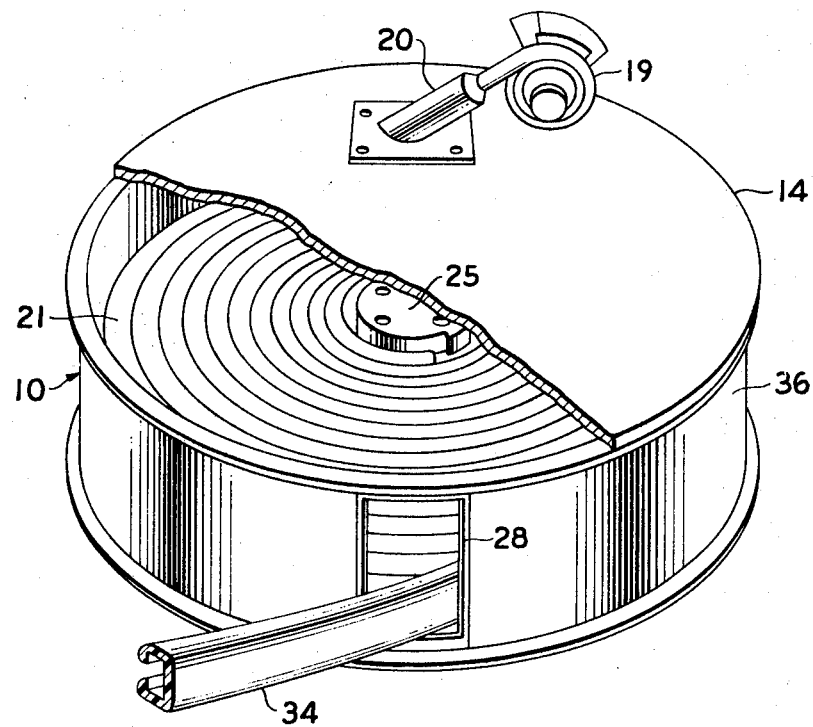
FIG. 1 is a perspective view of the installation apparatus, with part of the top portion of the apparatus cut away to expose a coil of handrail material as it appears in the apparatus.
Figure 2:
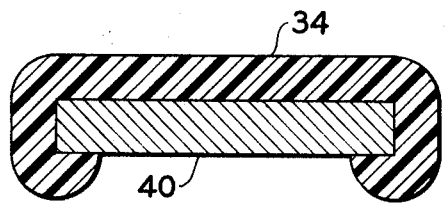
FIG. 2 is a profile view of thermoplastic handrail material as it appears on a support. The handrail material has basically a U-channel shape provided with undergrips for holding the handrail material onto the support.
Figure 3:
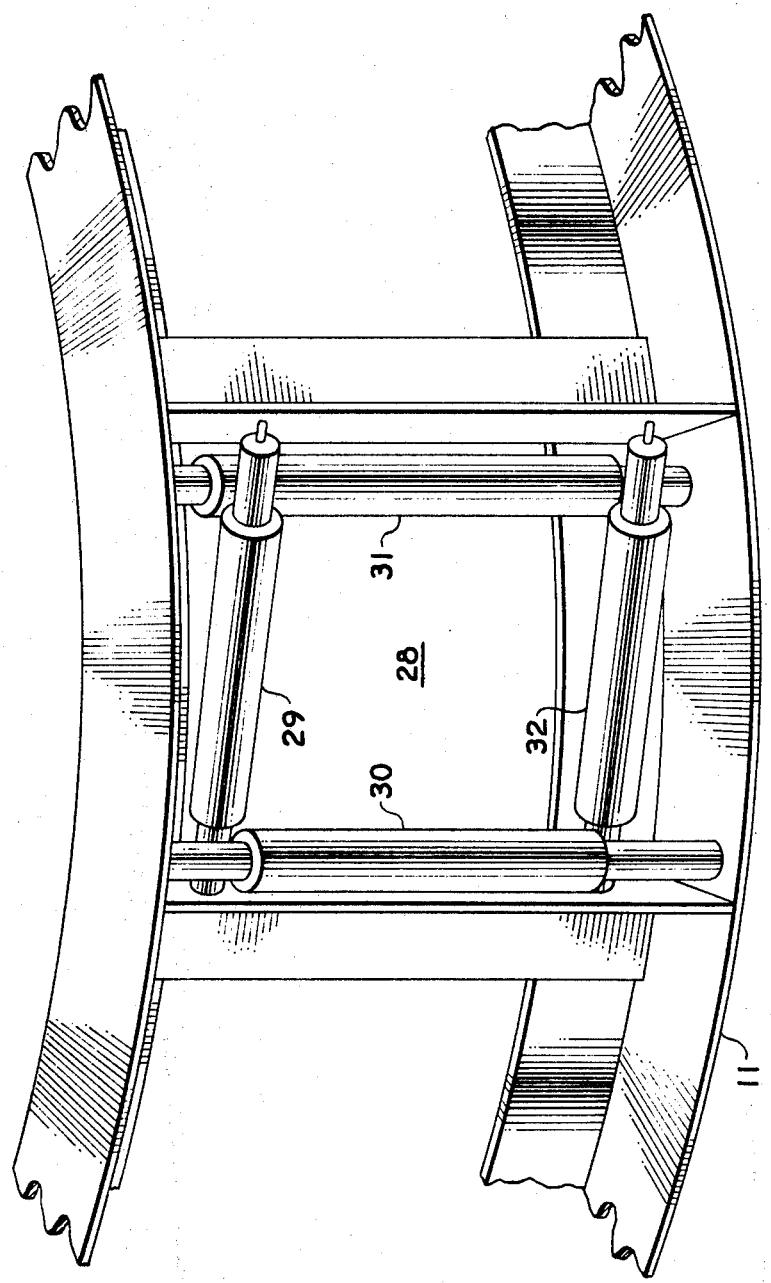
FIG. 3 is a detailed view of the aperture through which the handrail material is dispensed from the apparatus.
Figure 4:
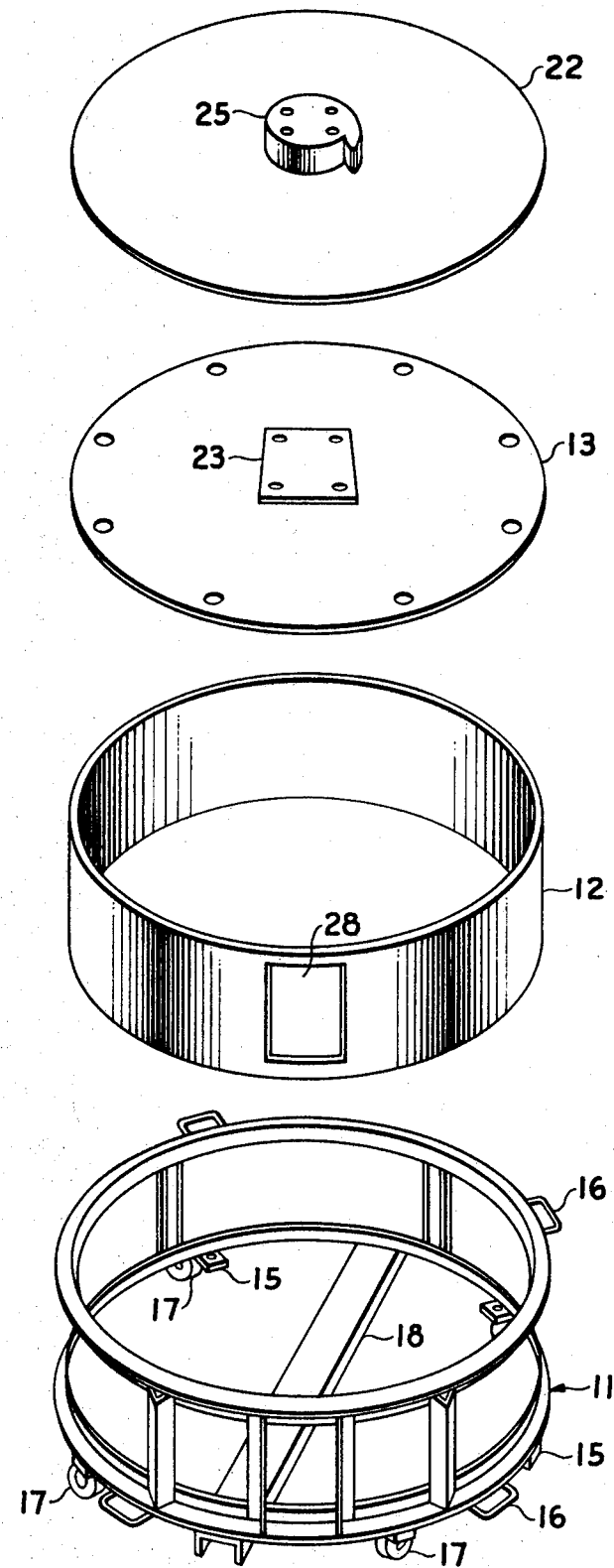
FIG. 4 is an exploded view of the apparatus of the invention.

Referring to the drawings in more detail, and the preferred embodiments shown therein, a vertically disposed, cylindrical housing 10 for the apparatus of the invention is comprised of a frame 11, a liner 12, a stationary bottom 13, and a removable cover 14. The frame has affixed thereto tabs 15, handles 16, casters 17, and support member 18. Mounted on the tabs 15 and the support member 18 is the stationary bottom 13. The liner 12, which can be made of a light gauge sheet metal, is inserted within the frame 11 and supported by the stationary bottom 13. The removable cover 14 rests atop the frame 11 and can be affixed thereto by suitable fasteners (not shown). One or more suitable heaters are mounted in the removable cover 14, such as the combination heater-blower 19, inserted in adapter 20 as shown in FIG. 1. Alternatively, strip heaters and other types of heating devices can be employed to provide sufficient heat within the housing 10 for softening the coiled thermoplastic material 21.

Figure 5:
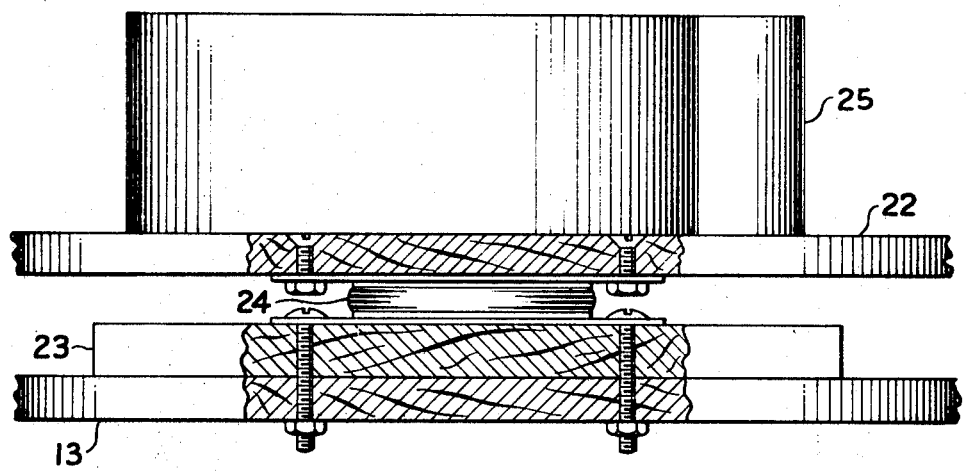
FIG. 5 is a detailed side elevation of the lazy Susan bearing mounting.

A holding means such as circular, rotatable table 22 is mounted within housing 10 on the stationary bottom 13. As shown in FIG. 5, a spacer plate 23 is attached to the stationary bottom 13. Mounted on the spacer plate is a lazy Susan bearing 24 which permits free rotation of the rotatable table 22, which is mounted atop the lazy Susan bearing 24. Mounted atop the rotatable table 22 is a center block 25 around which the coiled thermoplastic material is located on the rotatable table. The center block 25 is shaped with a notch which serves to stabilize the coil of thermoplastic material to prevent slippage of the coil on the rotatable table 22.

The housing 10 is provided with an aperture 28 in the vertically disposed side thereof, which is fitted with roller assemblies 29, 30, 31 and 32. These roller assemblies facilitate movement of the handrail 34 from the housing 10 through the aperture 28 without scratching or otherwise damaging the handrail material.

Figure 6:
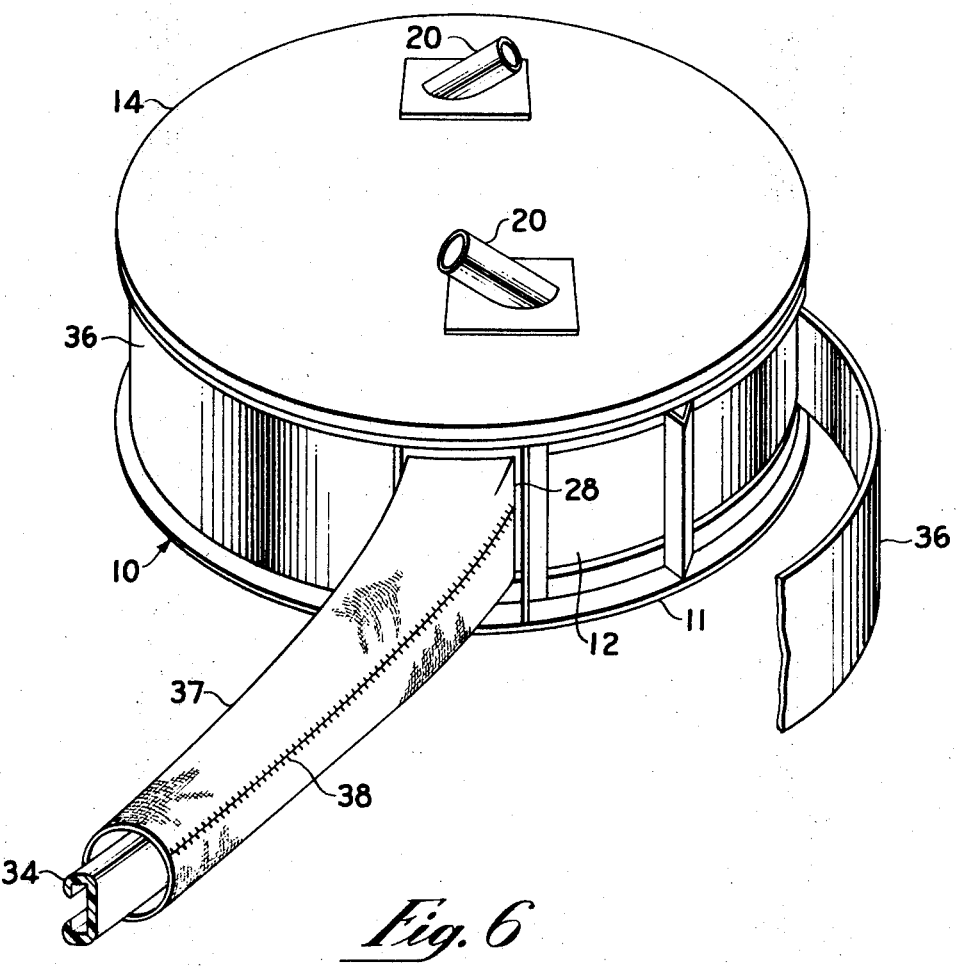
FIG. 6 is a perspective view of the apparatus of the invention showing an insulating jacket, and a fabric sleeve attached to the aperture through which the handrail material is dispensed.

As shown in FIG. 6, the housing 10 can be equipped with an insulated jacket 36 which serves to maintain the desired temperature within the housing 10. For use in certain applications, the housing 10 can also be equipped with a flexible sleeve 37 adapted to be attached to aperture 28. The flexible sleeve 37 can be made of any suitable material such as canvas or a fabric, and is equipped with a zipper 38. The flexible sleeve 37 is preferably tapered to be narrower in diameter or width at its open end than at the end of the sleeve attached to aperture 28. The flexible sleeve 37 is especially useful for maintaining the thermoplastic material in a heated condition and for preventing scratching and/or soiling of the thermoplastic material as it is removed from the housing 10, especially in applications wherein the thermoplastic material might tend to drag on the ground or floor.

In operation, one or more coils of handrail material are stacked on the rotatable table 22. The removable cover 14 is placed on the frame 11, and the heaters 19 are turned on. After the coiled thermoplastic material has been heated sufficiently to render it sufficiently flexible and workable for straightening and for ready application to the support, one end of the handrail material 34 is pulled through the aperture 28 in substantially rolling contact with the edges of the aperture 28, i.e., roller assemblies 29, and is applied to the support 40 by spreading the undergrips so that they snap around the support member. As the handrail material cools, it again becomes rigid so that the handrail material cannot be readily removed from the support member. As the handrail 34 is pulled through aperture 28 the coil of handrail material rotates in combination with the rotatable table 22. Scratching of the handrail material by the edges of the aperture is prevented by the roller assemblies such as 29, which rotate freely with the movement of the handrail 34 thereby reducing friction between the handrail material and the edges of the aperture 28.

The preferred type of handrail material for use in the apparatus of the invention is polyvinyl chloride. However, the thermoplastic material can suitably be any other normally solid, tehrmoplastic. Other suitable thermoplastics include the polyolefins, such as polyethylene, polypropylene, copolymers of ethylene with higher olefins, polystyrene, thermoplastic butadiene polymers and copolymers, such as butadiene-styrene block copolymers; and other polythenic compositions such as polyvinyl chloride-acetate copolymer, polyvinylidene chloride, acrylic polymers, and the like. Various other modifications of this invention can be made without departing from the underlying principles of the invention.

I claim:
1. A method for installing coiled, solid, rigid thermoplastic material on a workpiece which consists essentially of heating the coiled thermoplastic material while in a coiled position in a storage zone until it becomes sufficiently flexible for mounting on a workpiece, dispensing the flexible thermoplastic material from the storage zone at a rate such that it remains flexible while it is being applied to a workpiece, mounting the thermoplastic material on the workpiece, and cooling said material until rigid.

2. The method in acordance with claim 1 in which the thermoplastic material is polyvinyl chloride.

3. A method for installing coiled, solid, rigid thermoplastic material on a workpiece which consists essentially of heating the coiled thermoplastic material in an enclosed storage zone having an aperture until the material is sufficiently flexible for mounting on a workpiece, withdrawing the flexible material through the aperture in substantially rolling contact with the edges of the aperture and at a rate such that it remains flexible while it is being applied to a workpiece, mounting the material on a workpiece, and cooling said material until rigid.

4. The method in accordance with claim 3 in which the thermoplastic material is polyvinyl chloride.

5. A method for installing a solid, rigid polyvinyl chloride handrail material on a support which consists essentially of heating the handrail material while in a coiled position in an enclosed storage zone having an aperture until the material is sufficiently flexible for mounting on a support, withdrawing the flexible handrail material through the aperture in substantially rolling contact with the edges of the aperture such that there is reduced friction between the thermoplastic material and the edges of the aperture, at a rate such that it remains flexible while it is being applied to a support, mounting the material onto the support and cooling said material until rigid.

References Cited
UNITED STATES PATENTS

| 2,972,668 | 2/1961 | Westberg et al. | 219—244 |
| 3,038,982 | 6/1962 | Ludlow | 219—214 |

ROBERT F. WHITE, Primary Examiner

K. J. HOVET, Assistant Examiner

U.S. Cl. X.R.

222—146; 264—249, 345